Aug. 28, 1956 W. E. O'SHEI ET AL 2,760,801
DRIVING CONNECTION FOR WINDSCREEN WIPERS
Filed Aug. 4, 1952
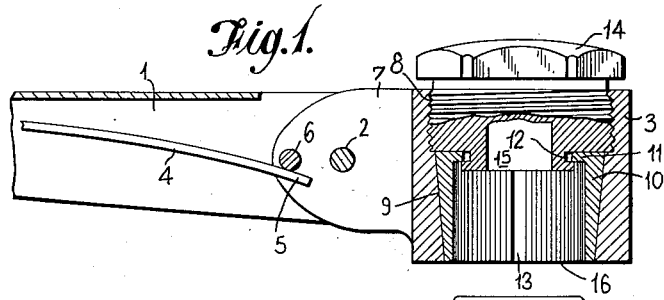
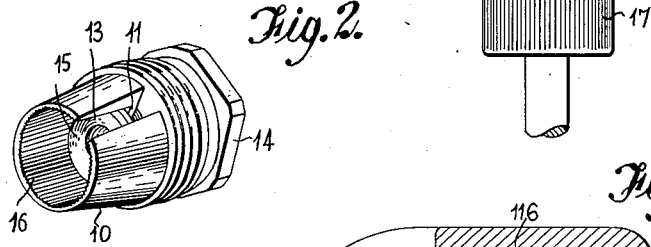
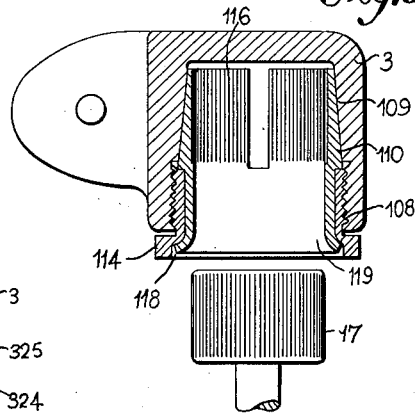
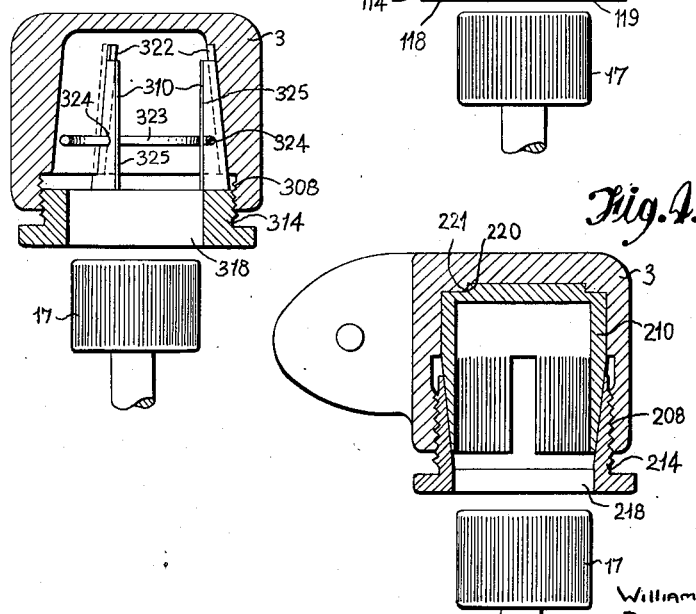
Inventor
William E. O'Shei
Robert D. Tomlin
By
Emery Holcombe & Blair
Attorneys

2,760,801

DRIVING CONNECTION FOR WINDSCREEN WIPERS

William Edward O'Shei, London, and Robert Derrick Tomlin, Feltham, England, said Tomlin assignor to said O'Shei Application August 4, 1952, Serial No. 302,555

Claims priority, application Great Britain August 8, 1951

5 Claims. (Cl. 287—53)

The present invention relates to windscreen wipers, and more particularly to means for fixing a wiper arm to a wiper arm spindle.

It is known to provide the outer surface of a wiper arm driving spindle with a plurality of splines or grooves extending parallel to the axis of the spindle, and to provide the wiper arm head with a complementary splined cavity which is adapted to slide axially on to the wiper arm driving spindle so that the two parts are keyed against relative rotational movement. Generally the wiper arm driving spindle is provided with an enlarged cylindrical end on which the splines are formed, the wiper arm head being locked thereon by a latch carried by the wiper arm engaging beneath the enlarged end on the spindle when the two parts are assembled together.

According to the present invention, for attaching a wiper arm to a splined spindle of the kind above referred to, the wiper arm head is provided with an aperture within which is fitted a tapered split collet of which the bore is formed with a plurality of splines, the arm head also being provided with a clamping nut for contracting the collet. The bore of the collet and the splines therein are made of such a size and disposition that the collet can fit over the splined end of the driving spindle and can be contracted by such an amount that it, and consequently the wiper arm, can be firmly clamped on to said splined end of the spindle.

The arrangement according to the invention has the advantage that it increases the tolerances permissible in manufacture, and, by reason of the collet splines firmly gripping on the splined spindle, reduces wear between the splines. It also enables a wiper arm to be firmly attached to a splined spindle of which the splines have become worn, thereby avoiding the necessity of fitting a new spindle. Further, before fully tightening the collet, the wiper arm can be turned therearound to adjust it to any required angular position relative to the wiper arm spindle, the collet then being fully tightened. This facilitates fitting the wiper arm; with previous constructions the adjustment could only be obtained by removing the arm and refitting it with the splines engaged in a different position, and such adjustment was limited to a few angular positions determined by the spacing of the splines.

Preferably the collet is interconnected with the clamping nut in such manner that the nut can be turned relative to the collet whilst withdrawal of the nut from the aperture in the wiper arm head also extracts the collet. The collet may also be split at two or more places. Only one of these splits need extend for the whole length thereof, the remainder extending only part way along the length of the collet.

In order to obtain a firm clamping of the collet on the spindle, it is important to ensure that the collet splines will clamp as close as possible to the base of the troughs between the splines on the spindle, that is at the root diameter of the splined spindle. This is achieved, according to a feature of the invention, by making the collet from material which is sufficiently soft to deform or compress upon itself, to conform during tightening with the shape and disposition of the splines on the spindle and thereby plastically flow into the bases between the said splines. Zinc base diecasting metal is suitable for this purpose and the collet is preferably made by diecasting, the internal splines being formed therein by the diecasting operation.

Alternatively, or in addition, the collet splines, which may be of the same configuration but more widely spaced than the splines on the spindle, may have longitudinal slots or splits between adjacent splines, so that each spline may adjust itself to extend well into the troughs between the splines on the spindle.

In order that the invention may be more clearly understood, reference will now be made to the accompanying drawings, in which:

Fig. 1 is a section through one construction of wiper arm head according to the invention, Fig. 2 is a perspective view of the collet and clamping nut assembly removed from the head, Figs. 3, 4 and 5 are sections through alternative constructions of wiper arm heads according to this invention.

Referring to Figs. 1 and 2, 1 denotes part of a wiper arm pivotally connected at 2 to a head 3. The arm 1 is spring-urged towards the windscreen, for example by a leaf spring 4 the free end 5 of which bears against a pin 6 arranged between two ears 7 formed on the head 3 and to which the arm 1 is pivoted. The head 3 is preferably made as a die-casting integrally with the ears 7.

The head 3 is formed with a bore extending therethrough the upper part of the bore being provided with a screw thread 8 and the lower portion 9 of which is of tapered form. Within the taper bore 9 is adapted to fit a tapered collet 10 provided at its large diameter end with an end wall 11 having a central aperture 12 smaller than the bore of the collet. The collet is also provided with a longitudinal split 13 which extends across the end wall 11 to reach the aperture 12, this split 13 enabling the collet to be compressed when the collet is urged into the tapered bore 9, by means of a clamping nut 14 screwed into the threaded portion 8 of the bore. The collet 10 and the clamping nut 14 are interlocked together by means of a hollow stud 15 projecting from the underside of the nut and through the aperture 12 in the end wall 11 of the collet, the free end of the stud being spun or otherwise peened over within the collet to secure the two parts together against relative longitudinal movement whilst permitting the nut and collet to turn freely relatively to one another.

The internal surface of the bore of the collet is formed with a plurality of longitudinal extending splines 16 corresponding to the splines on the enlarged cylindrical end 17 of the driving spindle. The collet is made of a relatively soft material, preferably from a zinc base die-casting, the splines 16 within the collet being formed by the casting operation. The outer tapered surface of the collet is machined so that it will slide freely over the tapered bore 9 in the arm head.

The tapered bore 9 has an axial length corresponding approximately to the length of the collet 10 and is accurately machined to the same taper as the external surface of the collet so that when the latter is forced into the tapered bore it will close in a substantially parallel fashion all along its length and firmly grip the splined end 17 of the driving spindle throughout its entire length.

The splines 16 on the internal surface of the collet are preferably made complementary in shape and disposition to the splines on the end 17 so that, as the clamping nut 13 is screwed into the arm head, the splines in the collet will extend deep into the troughs between the splines on the end 17. By reason of the collet being made of a relatively soft metal the clamping pressure can cause the splines on the internal surface thereof to deform or flow to conform with the splines on the end 17 and thus produce a very secure clamping between these parts which is free from backlash. Furthermore, the splines of the collet can also deform or flow to conform with the splines on an end 17 which may have become worn, thus enabling the wiper arm according to this invention to be firmly clamped on to a worn spindle end.

By reason of the collet being rotatable within the tapered bore, the fitting of the wiper arm at any desired angular position with respect to the driving spindle becomes a simple operation since it is only necessary to slide the collet over the splined end 17, then twist the arm to the desired relative angular position, and then tighten the clamping nut. This facilitates assembly operations in the manufacture of automotive vehicles.

By reason of the collet and clamping nut being interlocked together in the longitudinal direction, when the clamping nut is unscrewed it pulls the collet with it out of the tapered bore and thus releases the locking action of the collet on the splined end 17 of the driving spindle.

Fig. 3 shows an alternative construction in which the clamping nut 114 is fitted into the back of the wiper arm head 3 and is provided with a central bore 118 through which the splined end 17 of the spindle can be inserted into the split collet 110. With this embodiment the open end of the bore in the back of the arm head is threaded at 108 to receive the nut 114 and the inner end of the bore is tapered at 109 to cooperate with the tapered external surface of the collet. The collet is again made of die-casting material and is formed with splines 116 on its internal surface to engage with the splines on the end 17 of the driving shaft. The outer end of the collet is provided with a shank portion 119 which extends through the bore 118 in the clamping nut and has its outer end spun over to secure the two parts together for longitudinal movement whilst permitting relative rotation therebetween.

Fig. 4 shows another modification in which the split collet 210 is arranged with its tapered end adjacent the open end of the bore in the rear of the arm head 3, the collet being compressed by the tapered external surface of the collet being engaged by the tapered internal surface of the clamping nut 214 which screws into the thread 208 formed at the outer end of the bore in the arm head. The clamping nut is again provided with a central aperture 218 through which the splined end 17 of the driving spindle can be inserted into the collet. If desired the collet 210 may be locked against relative rotary movement in the arm head 3 by keying it in the bore, for example by forming its inner end with one or more flats 220 adapted to engage with one or more complementary flats 221 formed at the inner end of the bore in the arm head.

In the embodiment shown in Fig. 5, the collet is made in several parts each constituting one of the splines which is constructed to grip into the troughs between the splines on the end of the driving spindle. The collet is constituted by a plurality of triangular shaped members 310 cut from sheet metal. In the drawing the collet is constituted by three such members spaced approximately equi-angularly within the bore in the arm head and guided for longitudinal movement therein by their outer edges fitting within tapered grooves 322 within the bore. A spring wire loop 323 extends through apertures 324 in the members 310, tending to expand them to their largest diameter. The members are contracted by the clamping nut 314 which screws into a thread 308 at the outer end of the bore and bears against the outer ends of the members 310, the clamping nut being provided with a central aperture 318 through which the splined end 17 of the driving spindle can be inserted into the arm head. The internal edges of the collet members may be chamfered or sharpened, as shown at 325, to engage within the troughs between the splines on the end 17, the slight movement permitted to the members enabling them to move to positions in which they engage within the troughs and thus firmly clamp the arm head to the driving spindle.

Whilst particular embodiments have been described, it will be understood that various modifications may be made without departing from the scope of the invention. For example, instead of or in addition to making the splined collet of soft metal, the splined end of the driving spindle may be made of a zinc base diecasting or similar soft metal to facilitate the splines closely nesting together.

We claim:

1. Windscreen wiper apparatus comprising a wiper-driving spindle having a generally cylindrical free end which is provided with a plurality of axially extending splines in combination with a wiper arm having an arm-head provided with a bore extending through said head, a portion of said bore adjacent the rear thereof being of tapered form and a portion thereof at the other end of the bore being screw-threaded, a split collet having its outer surface tapered to correspond with the taper in the bore and its internal surface formed with a plurality of splines meshing with those on the driving spindle, said collet being made of zinc base die-casting material which, when compressed, conforms by plastic flow to the exact configuration of the driving spindle splines, said collet having an end wall at its larger diameter end with an aperture in said end wall, a clamping nut fitting within the screw thread in the bore and compressing said collet, a spigot extending from the inner end of the nut through the aperture in the end wall of the collet, and means at the free end of said spigot for preventing it from being longitudinally withdrawn through said aperture.

2. Windscreen wiper apparatus comprising a wiper-driving spindle having a generally cylindrical free end which is provided with a plurality of axially extending splines in combination with a wiper arm having an arm-head provided with a bore extending at least part way through said head, at least part of said bore being of tapered form, a split collet having at least part of its outer surface tapered to correspond with the taper in the bore and its internal surface formed with a plurality of splines meshing with those on the driving spindle, and a clamping nut screw-threaded to the arm head and engaging with the collet to urge the latter into the taper in the bore to contract the collet, said collet being made of soft metal having the hardness of zinc base die-casting material and which can deform or compress upon itself to conform by plastic flow with the configuration of the splines on the driving spindle when the collet is contracted thereon.

3. Windscreen wiper apparatus comprising a wiper-driving spindle having a generally cylindrical free end which is provided with a plurality of axially extending splines in combination with a wiper arm having an arm-head provided with a bore extending through said head, a screw-thread formed in one end of said bore and another portion of said bore being of tapered form and tapering to a smaller diameter in a direction away from said screw-threaded end, a split collet having at least part of its outer surface tapered to correspond with the taper in said bore and having its inner internal surface formed with a plurality of splines meshing with those on the driving spindle, said collet being fitted within said bore with its tapered outer surface within the tapered portion of the bore, a clamping nut screwed into the threaded end of the bore and bearing on the collet to urge the latter into the tapered portion of the bore and thereby contract the collet when the nut is screwed into the threaded portion of the bore, and means interlocking the collet with the nut for combined movement in the longitudinal direction whilst permitting relative turning movement therebetween, said collet being made of soft metal having the hardness of zinc base die-casting material which can deform or compress upon itself to conform by plastic flow with the configuration of the splines on the driving spindle when the collet is contracted thereon.

4. Windscreen wiper apparatus comprising a wiper-driving spindle having a generally cylindrical free end which is provided with a plurality of axially extending splines in combination with a wiper arm having an armhead provided with a bore extending through said head, a screw-thread formed in one end of said bore and another portion of said bore being of tapered form and tapering to a smaller diameter in a direction away from said screw-threaded end, a split collet having at least part of its outer surface tapered to correspond with the taper in said bore and having its inner internal surface formed with a plurality of splines meshing with those on the driving spindle, said collet having an end wall at its larger diameter end with an aperture in said end wall, said collet being fitted within said bore with its tapered outer surface within the tapered portion of the bore, a clamping nut screwed into the threaded end of the bore and bearing on the collet to urge the latter into the tapered portion of the bore and thereby contract the collet when the nut is screwed into the threaded portion of the bore, a spigot extending from the inner end of the nut through the aperture in the end wall of the collet, and means at the free end of said spigot for preventing it from being longitudinally withdrawn through said aperture, said collet being made of soft metal having the hardness of zinc base die-casting metal which can deform or compress upon itself to conform by plastic flow with the configuration of the splines on the driving spindle when the collet is contracted thereon.

5. Windscreen wiper apparatus comprising a wiper-driving spindle having a generally cylindrical free end which is provided with a plurality of axially extending splines in combination with a wiper arm having an armhead provided with a bore extending through said head, a screw-thread formed in one end of said bore and another portion of said bore being of tapered form and tapering to a smaller diameter in a direction away from said screw-threaded end, a split collet having at least part of its outer surface tapered to correspond with the taper in said bore and having its inner internal surface formed with a plurality of splines meshing with those on the driving spindle, said collet having an end wall at its larger diameter end with an aperture in said end wall, said collet being fitted within said bore with its tapered outer surface within the tapered portion of the bore, a clamping nut screwed into the threaded end of the bore and bearing on the collet to urge the latter into the tapered portion of the bore and thereby contract the collet when the nut is screwed into the threaded portion of the bore, said collet being made of soft metal which can deform or compress upon itself to conform by plastic flow with the configuration of the splines on the driving spindle when the collet is contracted thereon, a spigot extending from the inner end of the nut through the aperture in the end wall of the collet, and an enlarged head on said spigot for preventing it from being longitudinally withdrawn through said aperture.

References Cited in the file of this patent
UNITED STATES PATENTS

| Number | Name | Date |
|---|---|---|
| 1,284,163 | Walker | Nov. 5, 1918 |
| 1,491,342 | Eckhardt | Apr. 22, 1924 |
| 1,655,734 | McWilliams | Jan. 10, 1928 |
| 1,989,083 | Dahnken | Jan. 29, 1935 |
| 2,060,864 | Hedler | Nov. 17, 1936 |
| 2,515,303 | Isnard | July 18, 1950 |
| 2,587,862 | Krucki | Mar. 4, 1952 |

FOREIGN PATENTS

| Number | Country | Date |
|---|---|---|
| 497,366 | Great Britain | of 1938 |